United States Patent
Wang et al.

(10) Patent No.: US 12,041,442 B2
(45) Date of Patent: Jul. 16, 2024

(54) RANDOM MEDIA ACCESS CONTROL ADDRESS WITH FAST RECONNECTION MECHANISM

(71) Applicant: MEDIATEK INC., Hsin-Chu (TW)

(72) Inventors: Po-Fan Wang, Hsinchu (TW);
Tzu-Fan Hsu, Hsinchu (TW);
Shun-Yong Huang, Hsinchu (TW)

(73) Assignee: MEDIATEK INC., Hsin-Chu (TW)

( * ) Notice: Subject to any disclaimer, the term of this patent is extended or adjusted under 35 U.S.C. 154(b) by 206 days.

(21) Appl. No.: 17/394,338

(22) Filed: Aug. 4, 2021

(65) Prior Publication Data

US 2023/0043950 A1    Feb. 9, 2023

(51) Int. Cl.
*H04W 12/0431* (2021.01)
*H04W 12/03* (2021.01)
*H04W 12/041* (2021.01)
*H04W 12/69* (2021.01)
*H04W 80/02* (2009.01)

(52) U.S. Cl.
CPC ....... *H04W 12/0431* (2021.01); *H04W 12/03* (2021.01); *H04W 12/041* (2021.01); *H04W 12/69* (2021.01); *H04W 80/02* (2013.01)

(58) Field of Classification Search
CPC ............. H04W 12/0431; H04W 12/69; H04W 12/03; H04W 12/041; H04W 80/02
See application file for complete search history.

(56) References Cited

U.S. PATENT DOCUMENTS

| 9,204,473 B2 | 12/2015 | Wang |  |
| 2016/0142915 A1 | 5/2016 | Choyi |  |
| 2021/0345105 A1* | 11/2021 | Peer | H04W 12/0433 |
| 2021/0360465 A1* | 11/2021 | Henry | H04L 63/162 |

FOREIGN PATENT DOCUMENTS

TW          201427361 A        7/2014

OTHER PUBLICATIONS

Thomas Derham et al., PMKSA caching and MAC randomization, IEEE 802.11-19/0586r3, Wireless LANs, Apr. 1, 2019, p. 1-18, XP068151306. (Year: 2019).*

(Continued)

*Primary Examiner* — Kevin Bechtel
*Assistant Examiner* — Forrest L Carey
(74) *Attorney, Agent, or Firm* — Winston Hsu (57) ABSTRACT

The present invention provides a wireless communication method of an access point. The wireless communication method comprises the steps of: establishing a cache table comprising a plurality of reference MAC and corresponding PMKs and reference PMKIDs; receiving an association request from a station; reading a MAC address of the station and a PMKID from the association request; if the MAC address of the station and the PMKID do not match items of the cache table, performing a calculation on the PMKID to obtain an original PMKID; determining if the original PMKID matches any one of the reference PMKIDs within the cache table; and if the original PMKID matches one reference PMKID within the cache table, determining that the reference MAC recorded in the cache table and the MAC address belong to the same station.

3 Claims, 7 Drawing Sheets

(56) References Cited

OTHER PUBLICATIONS

Po-Kai Huang et al., Privacy Enhancement to avoid Element Fingerprint, IEEE 802.11-21/0839r0, May 13, 2021, p. 1-10, XP068181703.
Thomas Derham et al., PMKSA caching and MAC randomization, IEEE 802.11-19/0586r3, Wireless LANs, Apr. 1, 2019, p. 1-18, XP068151306.
Anonymous, 802.11 WLAN Roaming and Fast-Secure Roaming on CUWN, IEEE, p. 1-52, XP055953386, Aug. 29, 2019.
Nokia Networks, Security and authentication in LWA, 3GPP TSG-RAN WG2 Meeting #92, R2-156483, Anaheim, USA, Nov. 16-20, 2015, p. 1-4, XP051024579.

* cited by examiner

RANDOM MEDIA ACCESS CONTROL ADDRESS WITH FAST RECONNECTION MECHANISM

BACKGROUND

A media access control (MAC) address is a unique string of letters and numbers that is used to identify a device on a network and allow it to communicate with other devices. MAC addresses are usually assigned when the device is manufactured, and they generally do not change when moving from one network to another. In other words, MAC addresses have historically been static and unique to each device. However, because an access point (AP) or any Wi-Fi sniffer can monitor device locations without user consent by means of MAC addresses, the unique MAC address may have a bad impact on user privacy.

To solve this problem, a MAC address randomization is provided to allow the user device to connect to the AP by using different MAC addresses, that is the MAC address randomization can prevent listeners from using the MAC addresses to build a history of device activity. Although the MAC address randomization can increase user privacy, however, some fast reconnection mechanisms such as pairwise master key security association (PMKSA) caching may not be used. Specifically, when a device connects to the AP for the first time, the device initiates an 802.1X/Simultaneous Authentication of Equals (SAE) authentication with the AP, and after the authentication succeeds, the device and the AP save derived pairwise master key (PMK) and pairwise master key identifier (PMKID) in internal caches, wherein the PMK and PMKID are associated with the MAC address of the device. Then, if the device is disconnected from the AP for some reason, and the device needs to reconnect to the AP, the device can simply use the PMK and PMKID to reconnect to the AP without the 802.1X/SAE authentication, if the device has the same MAC address. Therefore, if the device uses different MAC address to reconnect to the AP, the method of using PMKSA caching for reconnection will fail, and the 802.1X/SAE authentication that has taking a long time needs to be performed again.

SUMMARY

It is therefore an objective of the preset invention to provide a method that allows the device to use MAC address randomization and PMKSA caching to reconnect to the AP, to solve the above-mentioned problems.

According to one embodiment of the present invention, a wireless communication method of a station comprises the steps of: wireless connecting to an AP by using a first MAC address, and performing authentication to generate a PMK and a PMKID; if the connection with the AP interrupted, and the station tries to reconnect to the AP, generating an association request comprising information of a second MAC address of the station and the PMKID, wherein the association request does not comprise the first MAC address of the station; and transmitting the association request to the AP.

According to another embodiment of the present invention, a wireless communication method of an access point comprises the steps of: establishing a cache table comprising a plurality of reference media access control address and corresponding pairwise master keys and reference pairwise master key identifiers; receiving an association request from a station; reading a MAC address of the station and a PMKID from the association request; if the MAC address of the station and the PMKID do not match items of the cache table, performing a calculation on the PMKID to obtain an original PMKID; determining if the original PMKID matches any one of the reference PMKIDs within the cache table; and if the original PMKID matches one reference PMKID within the cache table, determining that the reference MAC recorded in the cache table and the MAC address belong to the same station.

These and other objectives of the present invention will no doubt become obvious to those of ordinary skill in the art after reading the following detailed description of the preferred embodiment that is illustrated in the various figures and drawings.

DETAILED DESCRIPTION

Certain terms are used throughout the following description and claims to refer to particular system components. As one skilled in the art will appreciate, manufacturers may refer to a component by different names. This document does not intend to distinguish between components that differ in name but not function. In the following discussion and in the claims, the terms "including" and "comprising" are used in an open-ended fashion, and thus should be interpreted to mean "including, but not limited to . . . ". The terms "couple" and "couples" are intended to mean either an indirect or a direct electrical connection. Thus, if a first device couples to a second device, that connection may be through a direct electrical connection, or through an indirect electrical connection via other devices and connections.

Figure 1:
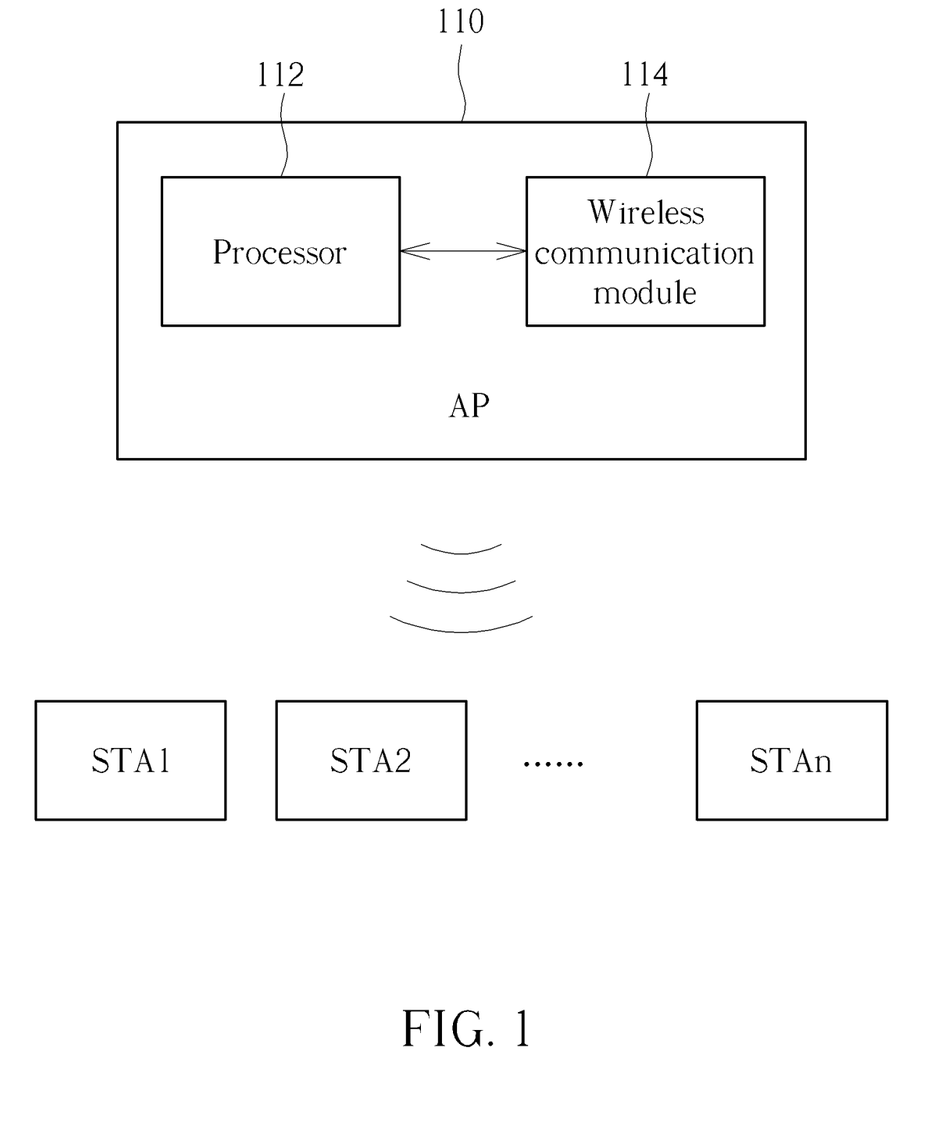
FIG. 1 is a diagram illustrating a wireless communication system according to one embodiment of the present invention.

FIG. 1 is a diagram illustrating a wireless communication system according to one embodiment of the present invention. As shown in FIG. 1, the wireless communication system comprises an AP 110 and a plurality of stations STA1-STAn, wherein the AP 110 comprises a processor 112 and a wireless communication module 114. In this embodiment, each of the stations STA1-STAn can be a cell phone, a tablet, a notebook, or any other electronic device capable of wirelessly communicating with the AP 110.

Figure 2A:
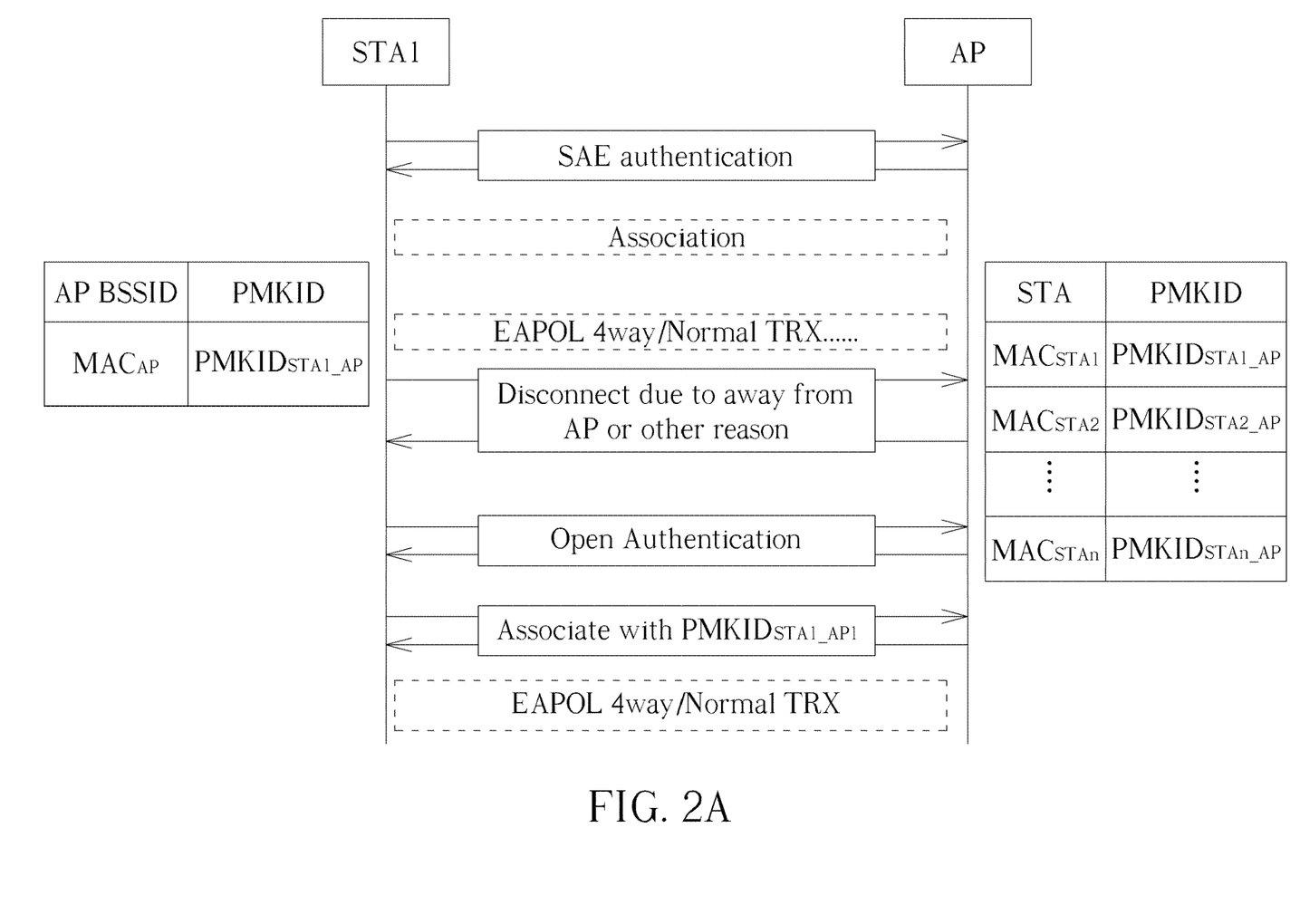
FIG. 2A is a flowchart of a method for establishing a link between the station and the AP with SAE authentication according to one embodiment of the present invention.

FIG. 2A is a flowchart of a method for establishing a link between the station STA1 and the AP 110 with SAE authentication according to one embodiment of the present invention. As shown in FIG. 2A, initially the station STA1 starts to connect to the AP 110, and the station STA1 and the AP 110 perform the SAE authentication to establish a link. After the authentication succeeds, the PMK is generally derived by the station STA1 and the AP 110, and a PMKID corresponding to the station STA1 and the AP 110 is also calculated, wherein the collection of the above information is called PMKSA. Then, the station STA1 stores a basic service set identifier (BSSID) of the AP 110 (i.e. the MAC address of the AP 110, $MAC_{AP}$) and the PMKID corresponding to the station STA1 and the AP 110 ($PMKID_{STA1\_AP}$); and the AP 110 stores the MAC address $MAC_{STA1}$ of the station STA1 and the corresponding PMKID ($PMKID_{STA1\_AP}$) in a cache table, wherein the cache table also comprises MAC addresses of the other stations and the corresponding PMKID, for example, the cache table further comprises $MAC_{STA2}$ and $PMKID_{STA2\_AP}$ for station STA2 and $MAC_{STAn}$ and $PMKID_{STAn\_AP}$ for station STAn. In the following descriptions, the MAC addresses and the PMKIDs stored in the cache table of the AP 110 may be called the reference MAC addresses and reference PMKIDs, respectively. It is noted that the SAE authentication and the generation of the PMK/PMKID are known by a person skilled in the art, so the relevant descriptions are omitted here.

Then, the station STA1 and the AP 110 perform association and extensible authentication protocol over LAN (EAPOL) 4-way for the further communications between the station STA1 and the AP 110.

The step for deriving the PMKSA shown in FIG. 2A uses SAE authentication. And the step for deriving the PMKSA may be 802.1X authentication as shown in FIG. 2B, that the PMKSA is established between the station STA1 and a back-end EAP authentication server.

In this case, the station STA1 disconnects from the AP 110 for some reasons, for example, the station STA1 is taken away from the AP 110. Then, if station STA1 is taken to a place close to the AP 110, the station STA1 will automatically reconnect to the AP 110. In addition, in order to provide a better privacy, the station STA1 may use a random MAC address to connect to the AP 110, that is the MAC address used by the station STA1 in this reconnection process is different from the MAC address $MAC_{STA1}$ used in the previous connection. In this embodiment, although the station STA1 uses different MAC address, the station STA1 and the AP 110 can use an open authentication and PMKSA caching, without using the 802.1X/SAE authentication, to establish the connection in a fast way. In detail, referring to FIG. 3, which shows a flowchart of a method for establishing the connection between the station STA1 and the AP 110 by using PMKSA caching according to one embodiment of the present invention. In Step 300, the flow starts. In Step 302, the station STA1 mixes the new MAC address $MAC_{STA1new}$ with $PMKID_{STA1\_AP}$ to generate a mixed PMKID, wherein the station STA1 may perform an exclusive or (XOR) operations on the new MAC address and $PMKID_{STA1\_AP}$ to generate a mixed PMKID. Then, the station STA1 uses the PMK to encrypt the mixed PMKID to generate an encrypted PMKID.

Figure 3:
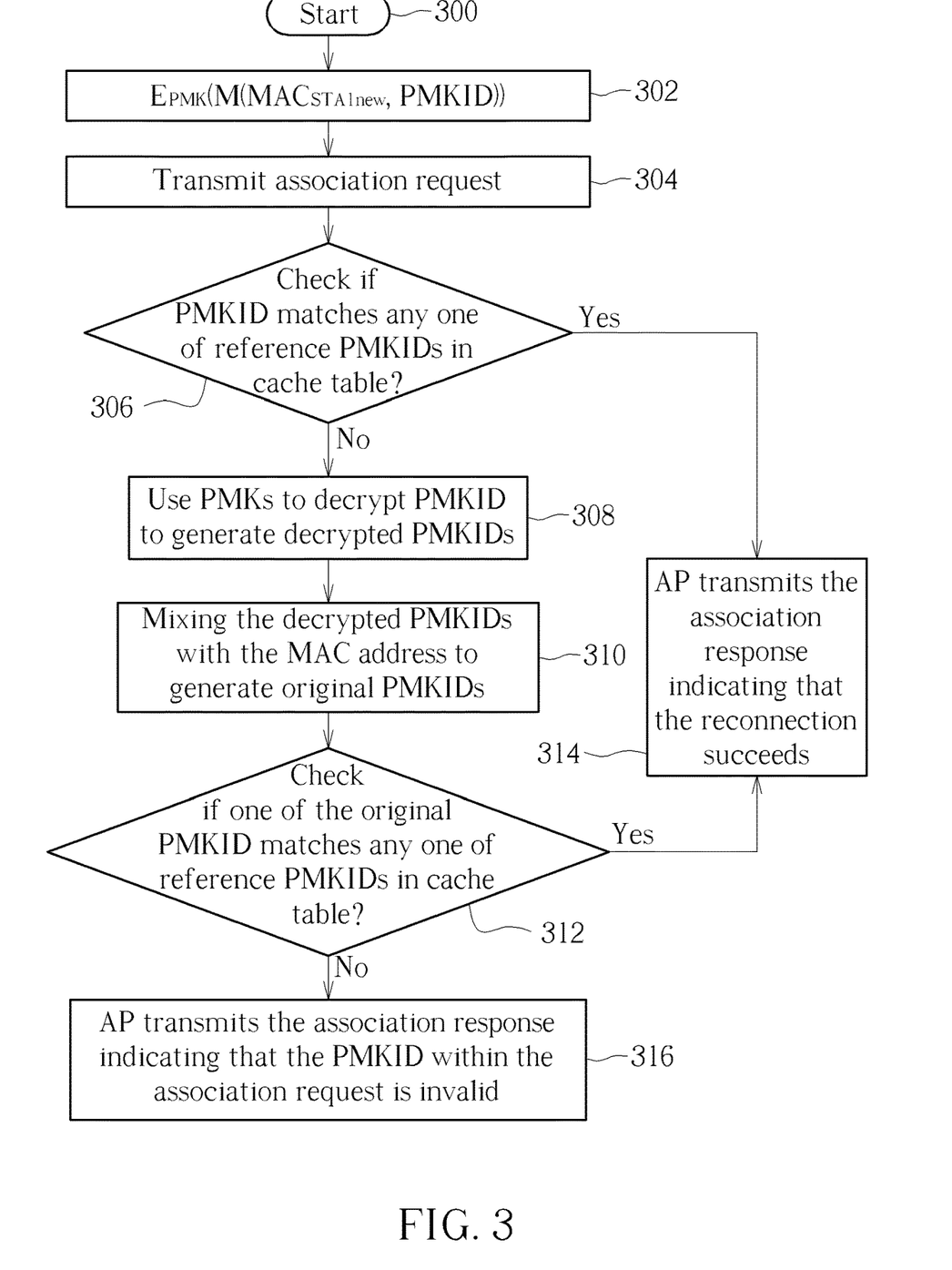
FIG. 3 is a flowchart of a method for establishing the connection between the station and the AP by using PMKSA caching according to one embodiment of the present invention.

In Step 304, the station STA1 sends an association request to the AP 110, wherein a PMKID field of the association request comprises the encrypted PMKID generated in Step 302. It is noted that the association request comprises the new MAC address $MAC_{STA1new}$ of the station STA1, but does not comprise the previous MAC address $MAC_{STA1}$ for the device privacy.

Figure 2B:
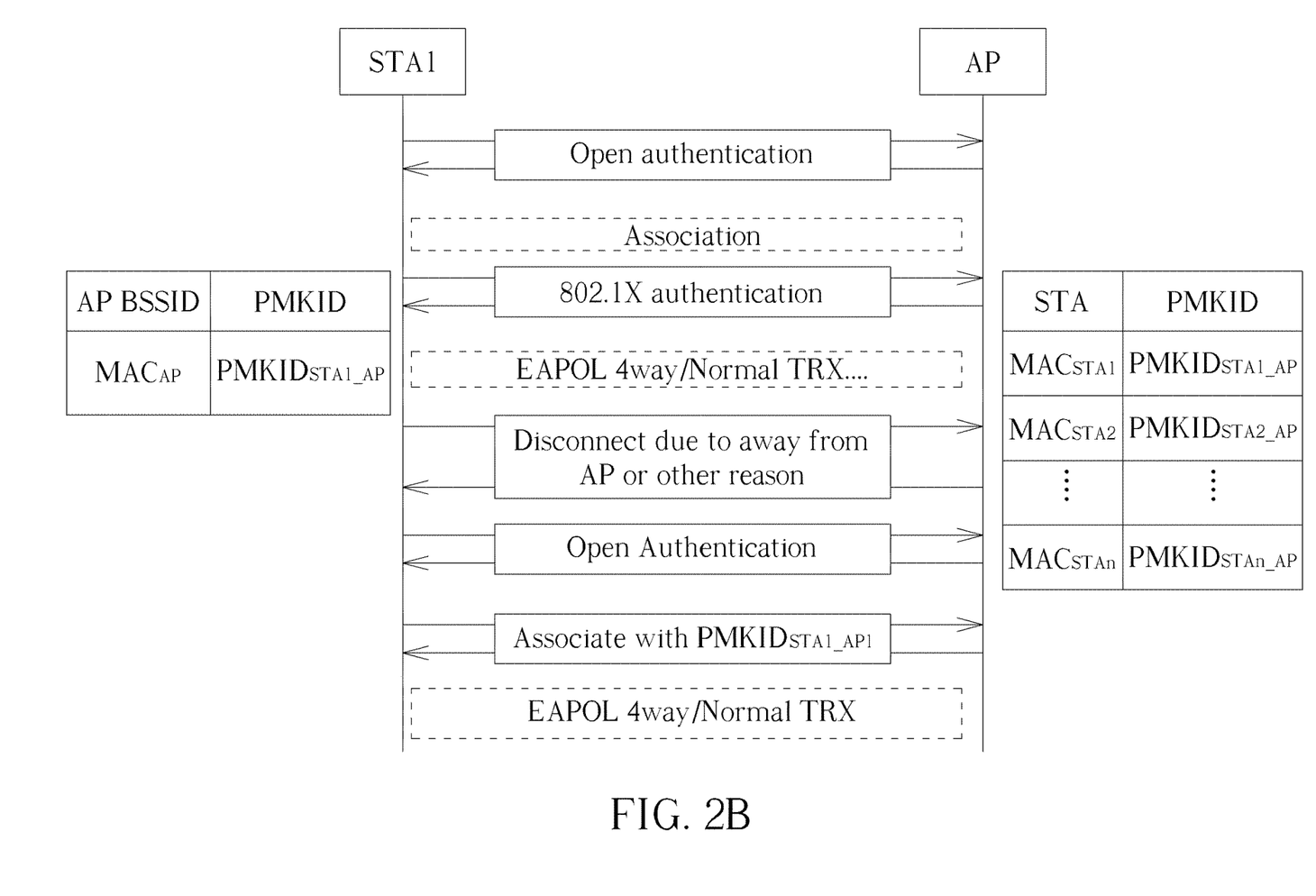
FIG. 2B is a flowchart of a method for establishing a link between the station and the AP with 802.1X authentication according to one embodiment of the present invention.

In Step 306, the AP 110 receives the association request of the station STA1, and the AP 110 determines if the PMKID within the PMKID filed (i.e., the encrypted PMKID) matches any one of the PMKIDs within the cache table shown in FIG. 2A and FIG. 2B, if yes, the flow enters Step 314; and if not, the flow enters Step 306. In this embodiment, because the PMKID filed of the association request comprises the encrypted PMKID generated by using mixing step and the encryption step, the PMKID within the association request will not match any one of the $PMKID_{STA1\_AP}$, $PMKID_{STA2\_AP}$, ..., $PMKID_{STAn\_AP}$ within the cache table.

Step 308, the AP 110 sequentially uses the PMKs of the stations to decrypt the PMKID to generate decrypted PMKIDs. Specifically, the AP 110 may use the PMK of the station STA1 to decrypt the PMKID to generate a first decrypted PMKID, use the PMK of the station STA2 to decrypt the PMKID to generate a second decrypted PMKID, . . . , and use the PMK of the station STAn to decrypt the PMKID to generate an $n^{th}$ decrypted PMKID. In this embodiment, the first decrypted PMKID generated by using the PMK of the station STA1 should be equal to the mixed PMKID generated in Step 302.

In Step 310, for every decrypted PMKID generated in Step 308, the AP 110 mixes the decrypted PMKID with the new MAC address $MAC_{STA1new}$ (e.g., using XOR operations) to generate an original PMKID, and the AP 110 determines if any one of the original PMKIDs matches one of the $PMKID_{STA1\_AP}$, $PMKID_{STA2\_AP}$, ..., $PMKID_{STAn\_AP}$ within the cache table, If yes, the flow enters Step 314; and if not, the flow enters Step 316. In this embodiment, the original PMKID generated by using the PMK of the station STA1 should be equal to the $PMKID_{STA1\_AP}$.

It is noted that the Steps 308 and Step 310 can be combined as one step, and once the AP 110 finds that the current processed original PMKID matches one of the $PMKID_{STA1\_AP}$, $PMKID_{STA2\_AP}$, ..., $PMKID_{STAn\_AP}$ within the cache table, the AP 110 can stop using the remaining PMK to decrypt the PMKID. Specifically, in this embodiment, the original PMKID generated by using the PMK of the station STA1 is equal to the $PMKID_{STA1\_AP}$ located in a first row of the cache table, so the AP 110 does not need to use the PMK of any one of the other stations STA2-STAn to decrypt the PMKID.

In Step 314, the AP 110 sends an association response the station STA1, wherein a status code of the association response records that the reconnection succeeds. In addition, the AP 110 updates the cache table by replacing $MAC_{STA1}$ by $MAC_{STA1new}$.

In Step 316, the AP 110 sends an association response the station STA1, wherein the status code of the association response records that the PMKID within the association request is invalid.

In this embodiment, after the Step 314, because the station STA1 successfully connects to the AP 110 by using PMKSA caching, the station STA1 and the AP 110 can directly perform EAPOL 4-way for the further communications between the station STA1 and the AP 110, without performing the 802.1X/SAE authentication.

In light of above, in the embodiment shown in FIG. 2A, FIG. 2B and FIG. 3, the station can effectively use the MAC address randomization and PMKSA caching to reconnect to the AP 110, without performing the 802.1X/SAE authentication. Therefore, the station will have a shorter connection time.

It is noted that the encryption operation in Step 302 and the decryption operation in Step 308 are optional, that is the PMKID field of the association request sent by the station STA1 comprises the mixed PMKID generated by mixing the new MAC address $MAC_{STA1new}$ with $PMKID_{STA1\_AP}$, and the AP 110 mixes the PMKID with the new MAC address $MAC_{STA1new}$ to generate an original PMKID. This alternative design shall fall within the scope of the present invention.

Figure 4A:
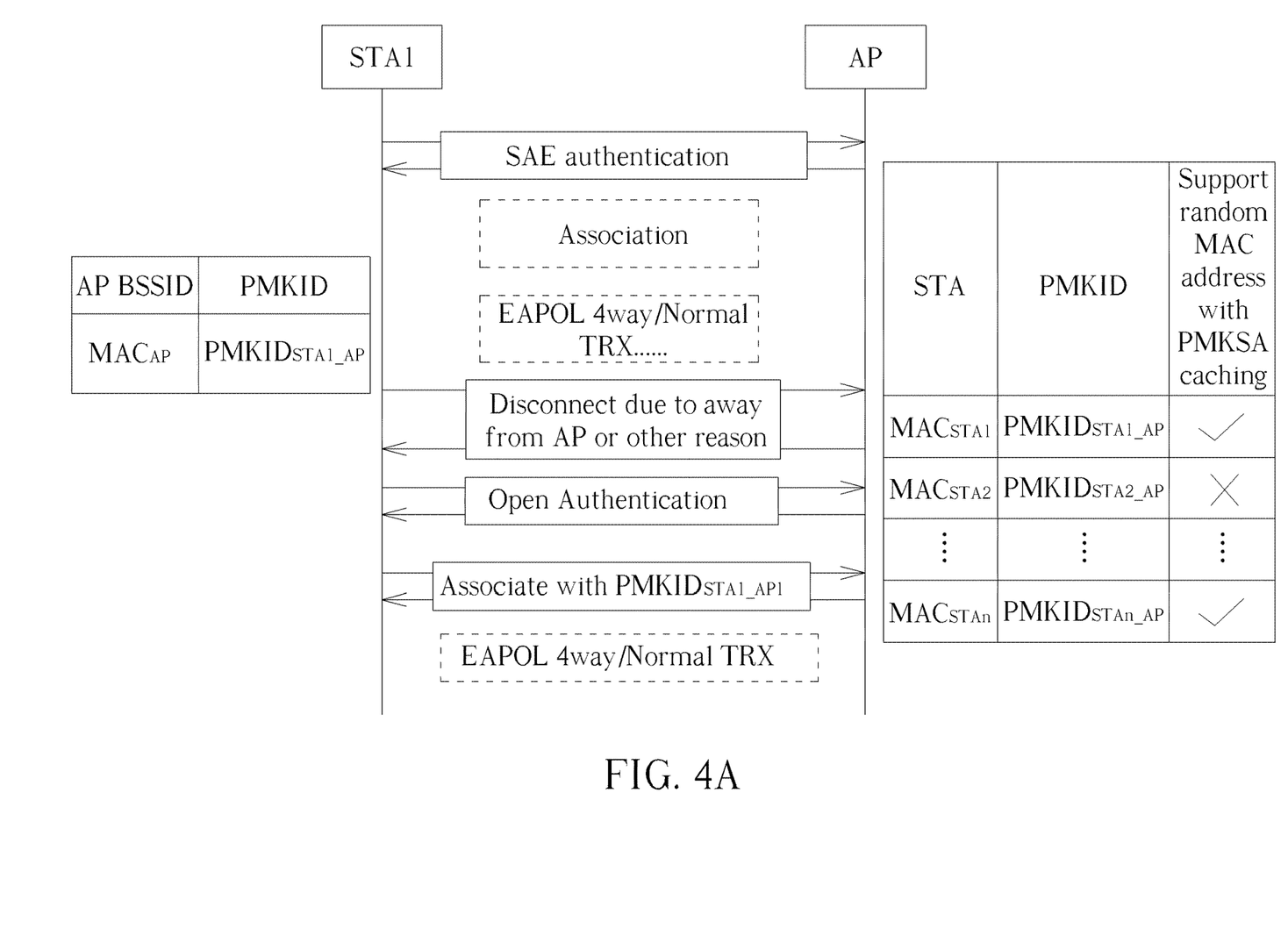
FIG. 4A is a flowchart of a method for establishing a link between the station and the AP with SAE authentication according to another embodiment of the present invention.

FIG. 4A is a flowchart of a method for establishing a link between the station STA1 and the AP 110 with SAE authentication according to another embodiment of the present invention. As shown in FIG. 4A, initially the station STA1 starts to connect to the AP 110, and the station STA1 and the AP 110 perform the SAE authentication to establish a link. After the authentication succeeds, the PMK is generally derived by the station STA1 and the AP 110, and a PMKID corresponding to the station STA1 and the AP 110 is also calculated, wherein the collection of the above information is called PMKSA. Then, the station STA1 stores a BSSID of the AP 110 (i.e. the MAC address of the AP 110, $MAC_{AP}$) and the PMKID corresponding to the station STA1 and the AP 110 ($PMKID_{STA1\_AP}$); and the AP 110 stores the MAC address $MAC_{STA1}$ of the station STA1 and the corresponding PMKID ($PMKID_{STA1\_AP}$) in a cache table, wherein the cache table also comprises MAC addresses of the other stations and the corresponding PMKID, for example, the cache table further comprises $MAC_{STA2}$ and $PMKID_{STA2\_AP}$ for station STA2 and $MAC_{STAn}$ and $PMKID_{STAn\_AP}$ for station STAn. In addition, in the communications between the station STA1 and the AP 110, beacons or probe requests responses from the AP 110 may have a vendor information element indicating that the AP 110 supports the random MAC address with PMKSA caching mechanism, and the association request from the station STA1 may also have a vendor information element indicating that the station STA1 supports the random MAC address with PMKSA caching mechanism. Therefore, the AP 110 can mark the station(s) supporting this mechanism in the cache table.

Then, the station STA1 and the AP 110 perform association and extensible authentication protocol over LAN (EAPOL) 4-way for the further communications between the station STA1 and the AP 110.

Figure 4B:
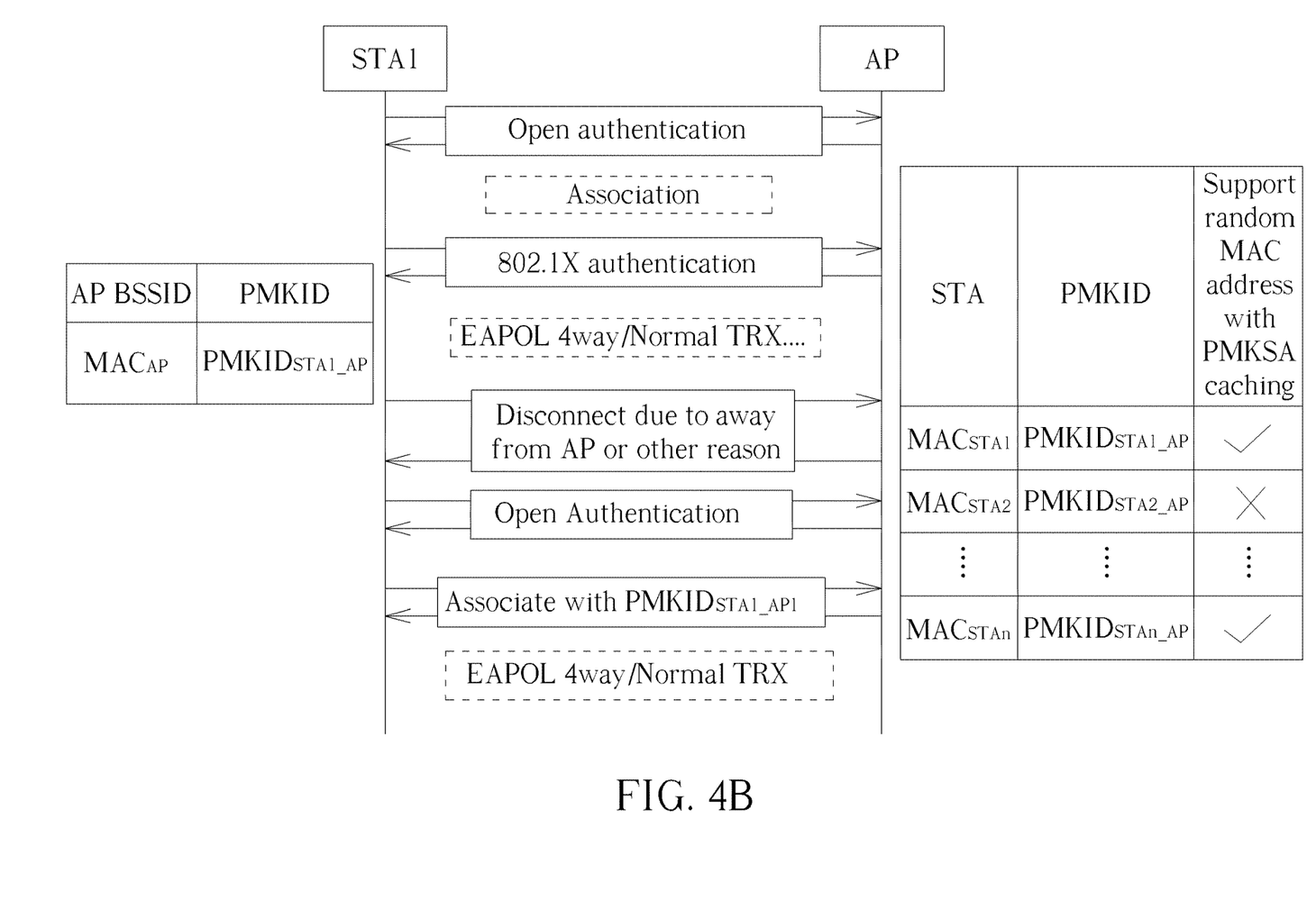
FIG. 4B is a flowchart of a method for establishing a link between the station and the AP with 802.1X authentication according to another embodiment of the present invention.

The step for deriving the PMKSA shown in FIG. 4A uses SAE authentication. And the step for deriving the PMKSA may be 802.1X authentication as shown in FIG. 4B, that the PMKSA is established between the station STA1 and a back-end EAP authentication server.

In this case, the station STA1 disconnects from the AP 110 for some reasons, for example, the station STA1 is taken away from the AP 110. Then, if station STA1 is taken to a place close to the AP 110, the station STA1 will automatically connect to the AP 110. In addition, in order to provide a better privacy, the station STA1 may use a random MAC address to connect to the AP 110, that is the MAC address used by the station STA1 in this reconnection process is different from the MAC address $MAC_{STA1}$ used in the previous connection. In this embodiment, although the station STA1 uses different MAC address, the station STA1 and the AP 110 can use an open authentication and PMKSA caching, without using the 802.1X/SAE authentication, to establish the connection in a fast way. In detail, referring to FIG. 5, which shows a flowchart of a method for establishing the connection between the station STA1 and the AP 110 by using PMKSA caching according to one embodiment of the present invention. In Step 500, the flow starts. In Step 502, the station STA1 mixes the new MAC address $MAC_{STA1new}$ with $PMKID_{STA1\_AP}$ to generate a mixed PMKID, wherein the station STA1 may perform an exclusive or (XOR) operations on the new MAC address and $PMKID_{STA1\_AP}$ to generate a mixed PMKID. Then, the station STA1 uses the PMK to encrypt the mixed PMKID to generate an encrypted PMKID.

Figure 5:
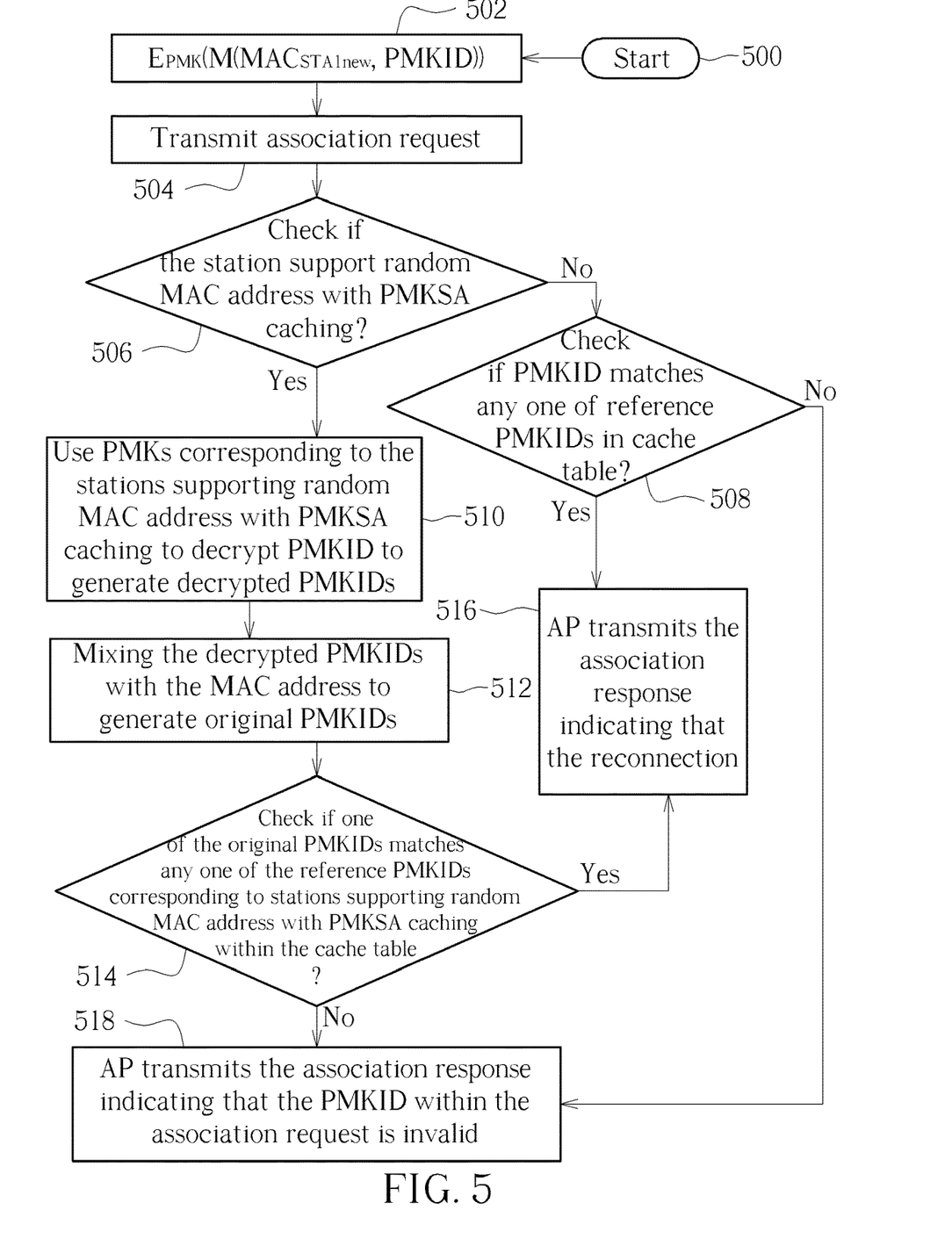
FIG. 5 is a flowchart of a method for establishing the connection between the station and the AP by using PMKSA caching according to another embodiment of the present invention.

In Step 504, the station STA1 sends an association request to the AP 110, wherein a PMKID field of the association request comprises the encrypted PMKID generated in Step 502. It is noted that the association request comprises the new MAC address $MAC_{STA1new}$ of the station STA1, but does not comprise the previous MAC address $MAC_{STA1}$ for the device privacy. Furthermore, the association request from the station STA1 has the vendor information element indicating that the station STA1 supports the random MAC address with PMKSA caching mechanism.

In Step 506, the AP 110 referring to the vendor information element within the association request to determine if the station STA1 supports the random MAC address with PMKSA caching mechanism, if yes, the flow enters Step 510; and if not, the flow enters Step 508.

In Step 508, the AP 110 determines if the PMKID within the PMKID filed matches any one of the PMKIDs within the cache table shown in FIG. 4A and FIG. 4B, if yes, the flow enters Step 516; and if not, the flow enters Step 518.

Step 510, the AP 110 refers to the cache table to select at least a portion of the station(s) supporting the random MAC address with PMKSA caching mechanism, and the AP 110 sequentially uses the PMKs of the selected stations to decrypt the PMKID to generate decrypted PMKIDs. Specifically, the AP 110 may use the PMK of the station STA1 to decrypt the PMKID to generate a first decrypted PMKID, and use the PMK of the station STAn to decrypt the PMKID to generate an $n^{th}$ decrypted PMKID. In this embodiment, the first decrypted PMKID generated by using the PMK of the station STA1 should be equal to the mixed PMKID generated in Step 502.

In Step 512, for every decrypted PMKID generated in Step 510, the AP 110 mixes the decrypted PMKID with the new MAC address $MAC_{STA1new}$ (e.g., using XOR operations) to generate an original PMKID, and in Step 514, the AP 110 determines if any one of the original PMKIDs matches one of the $PMKID_{STA1\_AP}$, $PMKID_{STA2\_AP}$, . . . , $PMKID_{STAn\_AP}$ corresponding to the stations supporting random MAC address with PMKSA caching within the cache table, If yes, the flow enters Step 516; and if not, the flow enters Step 518. In this embodiment, the original PMKID generated by using the PMK of the station STA1 should be equal to the $PMKID_{STA1\_AP}$.

It is noted that the Steps 510 and Step 512 can be combined as one step, and once the AP 110 finds that the current processed original PMKID matches one of the $PMKID_{STA1\_AP}$, $PMKID_{STA2\_AP}$, . . . , $PMKID_{STAn\_AP}$ within the cache table, the AP 110 can stop using the remaining PMK to decrypt the PMKID. Specifically, in this embodiment, the original PMKID generated by using the PMK of the station STA1 is equal to the $PMKID_{STA1\_AP}$ located in a first row of the cache table, so the AP 110 does not need to use the PMK of any one of the other stations STA2-STAn to decrypt the PMKID.

In Step 516, the AP sends an association response the station STA1, wherein a status code of the association response records that the reconnection succeeds. In addition, the AP 110 updates the cache table by replacing $MAC_{STA1}$ by $MAC_{STA1new}$.

In Step 518, the AP sends an association response the station STA1, wherein the status code of the association response records that the PMKID within the association request is invalid.

In this embodiment, after the Step 516, because the station STA1 successfully connects to the AP 110 by using PMKSA caching, the station STA1 and the AP 110 can directly perform EAPOL 4-way for the further communications between the station STA1 and the AP 110, without performing the 802.1X/SAE authentication.

It is noted that the encryption operation in Step 502 and the decryption operation in Step 510 are optional, that is the PMKID field of the association request sent by the station STA1 comprises the mixed PMKID generated by mixing the new MAC address $MAC_{STA1new}$ with $PMKID_{STA1\_AP}$, and the AP 110 mixes the PMKID with the new MAC address $MAC_{STA1new}$ to generate an original PMKID. This alternative design shall fall within the scope of the present invention.

In light of above, in the embodiment shown in FIG. 4A, FIG. 4B and FIG. 5, the station can effectively use the MAC address randomization and PMKSA caching to reconnect to the AP 110, without performing the 802.1X/SAE authentication, and the AP 110 can use PMKs of only a portion of the stations to decrypt the PMKID. Therefore, the station will have a shorter connection time. In addition, compared with the embodiment shown in FIG. 3, for association request comprising the vendor information indicating that the station supporting the random MAC address with PMKSA caching, the AP 110 only need to process those PMKs/PMKIDs corresponding to the stations supporting random MAC address with PMKSA caching instead of processing all PMKs/PMKIDs in the cache table during Step 510, Step 512 and Step 514 Therefore, the reconnection time can be further shortened.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A wireless communication method of a station, comprising:
    connecting to an access point (AP) by using a first media access control (MAC) address, and performing authentication to generate a pairwise master key (PMK) and a pairwise master key identifier (PMKID);
    if the connection with the AP is interrupted, and the station tries to reconnect to the AP, generating an association request comprising information of a second MAC address of the station and the PMKID, wherein the association request does not comprise the first MAC address of the station; and
    transmitting the association request to the AP;
    wherein the step of generating the association request comprising information of the second MAC address of the station and the PMKID comprises:
        mixing the second MAC address with the PMKID to generate a mixed PMKID;
        using the PMK to encrypt the mixed PMKID to generate an encrypted PMKID; and
        generating the association request comprising the encrypted PMKID.

2. The wireless communication method of claim 1, wherein the step of mixing the second MAC address with the PMKID to generate the mixed PMKID comprises:
    performing a mixing operation on the second MAC address with the PMKID to generate the mixed PMKID, wherein the PMKID is obtained if the mixing operation is performed on the mixed PMKID and the second MAC address.

3. The wireless communication method of claim 1, wherein the association request further comprises information element indicating that the station supports a random MAC address with PMKSA caching mechanism.

\* \* \* \* \*